US012561606B2

(12) United States Patent
Patel et al.

(10) Patent No.: US 12,561,606 B2
(45) Date of Patent: Feb. 24, 2026

(54) TECHNIQUES FOR POLL INTENTION DETECTION AND POLL CREATION

(71) Applicant: Microsoft Technology Licensing, LLC, Redmond, WA (US)

(72) Inventors: Bhargavkumar Kanubhai Patel, Gujarat (IN); Vipin Gupta, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 981 days.

(21) Appl. No.: 17/724,783

(22) Filed: Apr. 20, 2022

(65) Prior Publication Data

US 2023/0342657 A1    Oct. 26, 2023

(51) Int. Cl.
  *G06Q 30/0201*    (2023.01)
  *G06N 20/00*    (2019.01)
(52) U.S. Cl.
  CPC ......... *G06N 20/00* (2019.01); *G06Q 30/0206* (2013.01)
(58) Field of Classification Search
  CPC ... G06N 20/00; G06F 16/951; G06Q 30/0203
  See application file for complete search history.

(56) References Cited

U.S. PATENT DOCUMENTS

| | | | |
|---|---|---|---|
| 2011/0125734 A1* | 5/2011 | Duboue ................... | G09B 7/00 |
| | | | 707/723 |
| 2016/0218998 A1* | 7/2016 | Sheth ....................... | H04L 51/04 |
| 2017/0063744 A1* | 3/2017 | Banerjee ............. | G06F 3/04842 |
| 2017/0161759 A1* | 6/2017 | Li ........................ | G06F 16/3329 |
| 2018/0246983 A1* | 8/2018 | Rathod ................. | G06F 16/972 |
| 2018/0276462 A1* | 9/2018 | Davis ..................... | G06V 30/15 |
| 2020/0334697 A1* | 10/2020 | BaderEddin ............ | G06F 40/20 |
| 2020/0342470 A1* | 10/2020 | Morningstar ...... | G06Q 30/0203 |
| 2023/0316943 A1* | 10/2023 | Bhattacharya ........... | G09B 7/00 |

* cited by examiner

*Primary Examiner* — Beau D Spratt
(74) *Attorney, Agent, or Firm* — Cantor Colburn LLP; Renee D Brown

(57)    ABSTRACT

Described herein are techniques for using supervised machine learning to determine whether a content posting posted to a feed of an online service, has been posted with the intent that the content posting is a poll or survey. Upon making a determination that a content posting is or includes a poll, the content posting is further analyzed to identify within the content posting a question and/or answers to the question. The identified question and answers are then used to populate data fields associated with a formal or structured poll, and the end-user who posted the content posting is provided an option to convert the poll from a first content posting format to a second content posting format that is specifically for a formal or structured poll.

17 Claims, 7 Drawing Sheets

IT APPEARS THAT YOUR CONTENT POSTING IS ASKING FOR VOTES FROM OTHER MEMBERS. OUR SYSTEM HAS GENERATED A STRUCTURED POLL FOR YOU AUTOMATICALLY. WOULD YOU LIKE TO CONVERT YOUR CONTENT POSTING TO A POLL?

500-A    YES    NO

CREATE A POLL

YOUR QUESTION:
WHICH VIDEO CONFERENCING SOFTWARE DO YOU PREFER?

OPTION #1
ZOOM

OPTION #2
GOOGLE MEET

OPTION #3
ZOOM

OPTION #4
MICROSOFT TEAMS

POLL DURATION
ONE WEEK

BACK    DONE

500-B

CONTENT ITEM 202

Figure 5:
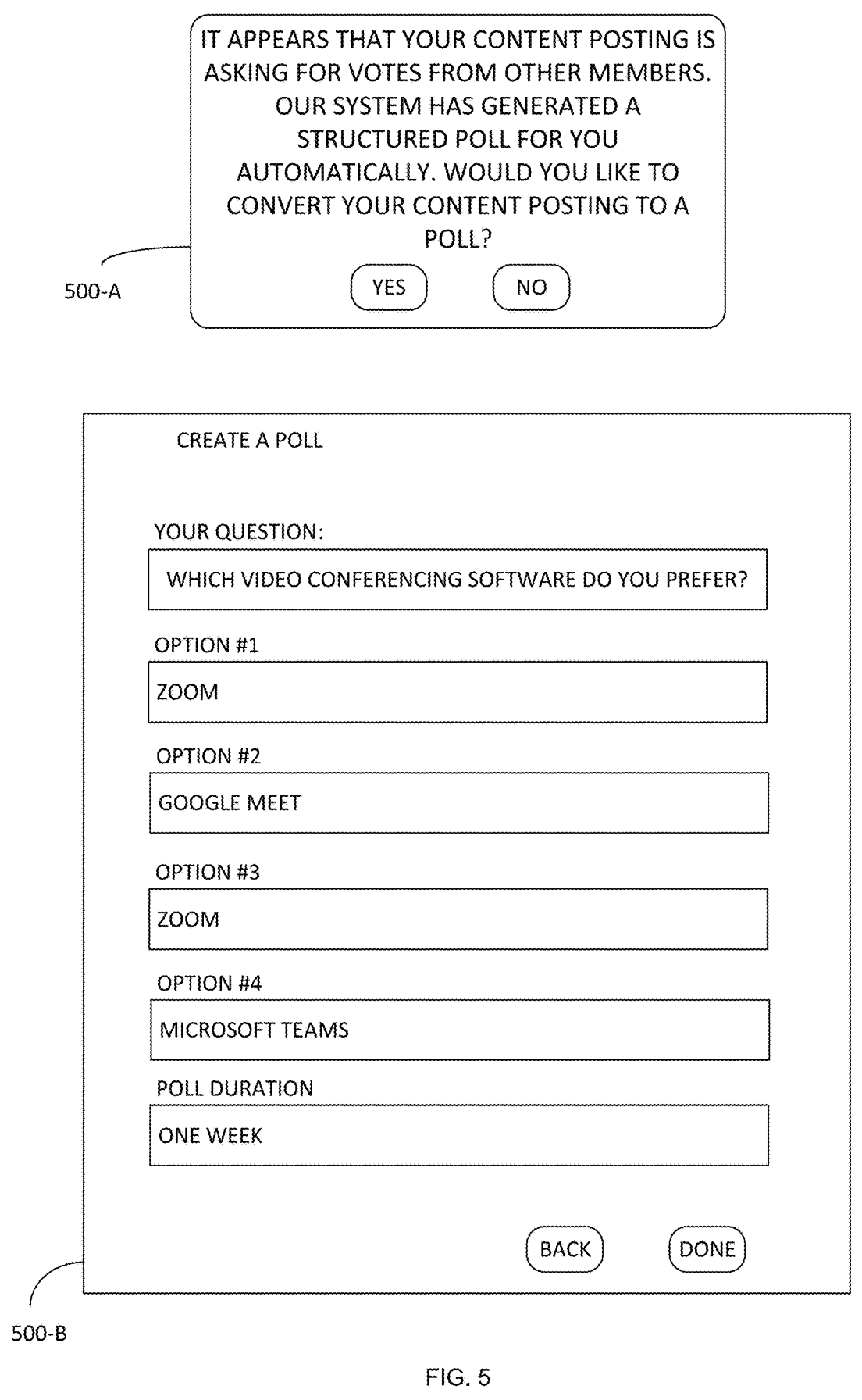

IT APPEARS THAT YOUR CONTENT POSTING IS ASKING FOR VOTES FROM OTHER MEMBERS. OUR SYSTEM HAS GENERATED A STRUCTURED POLL FOR YOU AUTOMATICALLY. WOULD YOU LIKE TO CONVERT YOUR CONTENT POSTING TO A POLL?

( YES )    ( NO )

500-A

CREATE A POLL

YOUR QUESTION:

WHICH VIDEO CONFERENCING SOFTWARE DO YOU PREFER?

OPTION #1

ZOOM

OPTION #2

GOOGLE MEET

OPTION #3

ZOOM

OPTION #4

MICROSOFT TEAMS

POLL DURATION

ONE WEEK ( BACK )    ( DONE )

TECHNIQUES FOR POLL INTENTION DETECTION AND POLL CREATION

TECHNICAL FIELD

The present application generally relates to supervised machine learning techniques for use in classifying content that has been posted to a feed. More precisely, the present application describes machine learned classification techniques for use in predicting when a content item posted to and presented in a feed using a first content posting format should be modified for presentation in a different, content posting format that is better suited to the content item.

BACKGROUND

Many online services facilitate the sharing of content through an application or service referred to as a feed—sometimes referred to as an activity feed, content feed, or news feed. Depending upon the nature of the online service and the community of people served, the content that is posted to and presented via a feed will vary greatly. By way of example, many content postings shared via a feed involve or include content that has been generated by others. For instance, an end-user of an online service may specify or provide a link (e.g., a URL) to share, via a feed, where the link is directed to a news article that is being hosted on a third-party website. Many content postings shared via a feed may involve or include original, user-generated content. For example, end-users may utilize any of a wide variety of content creation applications and tools to create original content, such as photos, images, graphics, videos, and so forth, which are then shared via the feed of an online service.

Creating and sharing a content posting via a feed typically involves interacting with a user interface of the feed that enables an end-user to enter text to be shared, upload digital assets (e.g., photos, videos, graphics, other content, etc.) to be shared, and/or specify a link to the location of some form of digital asset (e.g., a webpage, a photo, a video, and so forth) hosted at a third-party website. In some instances, the user interface for creating and sharing a content posting may provide one or more options for generating a specific type of structured content posting—such as a long format article, an event, an announcement (e.g., the celebration of a special occasion, or an announcement concerning a company that is hiring employees), or a poll or survey. By way of example, by simply selecting a button, or similar graphical user interface (GUI) element, an end-user may opt to create an event to be shared via the feed. Accordingly, the user interface for the creation of an event may provide one or more specific data entry elements or prompts, via which the end-user specifies information specific for creating the event, such as the date and/or time of the event, the location of the event, a summary description of the event, and so forth. Similarly, in some instances, the user interface may include a button or similar GUI element that, when selected, enables an end-user to create and share a poll, via the feed. In the case of a poll, the user interface for creating the poll may, for example, prompt the end-user to specify or provide a question and one or more selectable answers to the question. When presented to end-users via the feed, the poll is presented such that the end-user to whom the poll is presented can indicate or select his or her preferred answer to the question.

There are several advantages to creating and sharing a structured content posting, such as an event or a poll. For example, when a content posting is formatted as an event, viewers of the content posting may be presented with an interactive user interface element as part of the content posting that allows the viewer to indicate interest in attending the event, or even provide an indication, privately or publicly, that he or she plans to attend the event. In the case of a poll, end-users presented with a formal, structured poll, may be presented with an interactive user interface that allows the end-user to, publicly or privately, select one or more of the answers to the question provided as part of the poll. Similarly, when a content posting is created as a formal, structured poll, the end-user who has posted the poll may be provided with analytics, including a report indicating such information as the number of end-users who have viewed the poll, and the number of end-users who selected each of the several answers specified as part of the poll.

However, in many instances, when an end-user is preparing a content posting, the end-user may not know about the option of selecting a structured content posting, such as a formal content posting relating to an event or a poll. In such instances, the end-user may provide user-generated content to announce an event or simulate a poll. As described below, this generally tends to result in a less than optimal end-user experience for both the end-user who is posting the content item, as well as those end-users who are view the content posting.

BRIEF DESCRIPTION OF THE DRAWINGS

Embodiments of the present invention are illustrated by way of example and not limitation in the figures of the accompanying drawings, in which:

FIG. 5 is a flow diagram illustrating operations or steps performed as part of a method for determining that a content posting is intended to be a poll, consistent with embodiments of the invention;

DETAILED DESCRIPTION

Figure 1:
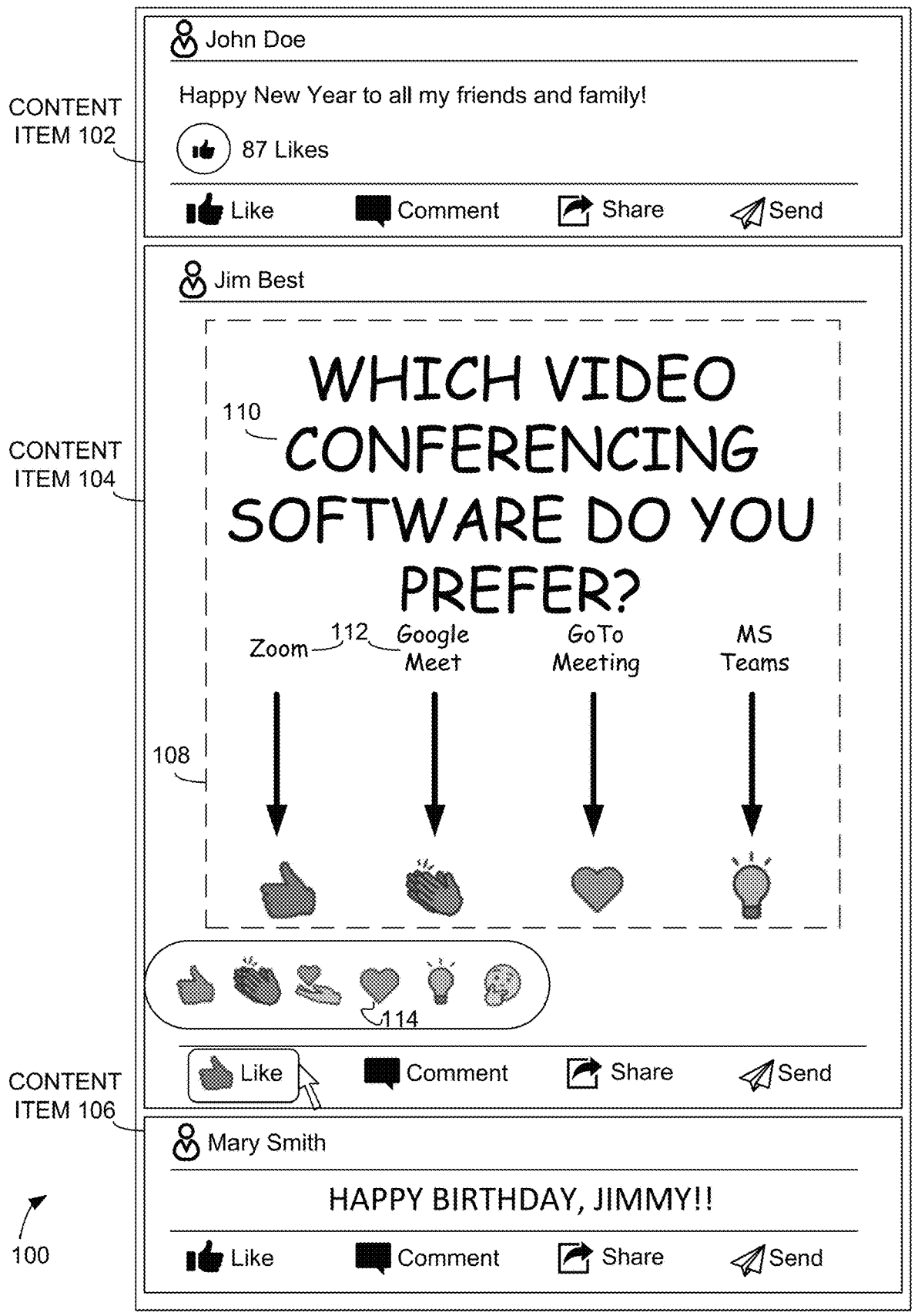
FIG. 1 is a user interface diagram illustrating a first example of a user interface for a feed, including a content item posted as an image and representing a poll.

Described herein are methods and systems for providing a content posting, posted to a feed of an online service, as input to a pre-trained machine learning model that, upon processing the content posting, outputs data used to predict whether or not the content posting was posted with the intention of the content posting being a poll. Consistent with some embodiments, when a determination is made that a content posting was intended as a poll, a recommendation or message is presented, to the end-user who posted the content posting, where the recommendation or message provides the end-user with an option to convert the informal poll, to a formal, or structured poll. Specifically, the recommendation provides the option to have the content posting converted from a first content posting format to a second content posting format that is intended for formal or structured polls. Accordingly, if the end-user opts to convert the informal poll to a formal or structured poll, the content posting is further analyzed to detect and identify portions of text representing a question and one or more answers, which are then automatically associated with (e.g., stored in) specific data fields of a data structured associated with the content posting format for a formal or structured poll. It will be evident, however, to one skilled in the art, that the present invention may be practiced and/or implemented with varying combinations of the many details and features presented herein.

For purposes of the present disclosure, a content posting in a first content posting format is or includes an informal poll when the end-user who posted the content posting used the default content posting format, instead of explicitly selecting or specifically opting to have the content posting formatted and presented as a formal or structured poll. By way of example, many online services provide a feed application that has a default content posting user interface, sometimes referred to as a sharing user interface, via which an end-user provides or specifies content to be included in a content posting that will be posted to the feed. For instance, the default content posting user interface may provide a simple text input box via which the end-user can input text to be included as part of the content posting. Similarly, the default user interface may have one or more graphical user interface (GUI) elements, such as buttons, which, when selected, causes a user interface to be presented, providing the end-user with that ability to specify a file (e.g., a graphic, a photo, a video, etc.) to be uploaded from a remotely hosted location to the online service for inclusion with the content posting. In many instances, a separate GUI element, for example, a button, may allow the end-user to specify that a content posting is intended as a poll, and should therefore be presented in a content posting format that is specific to a formal or structured poll. In such instances, a separate, custom user interface, different from the default content posting user interface, may be presented to the end-user, allowing the end-user to explicitly specify input (e.g., text) as the question for the poll, and separately, the various answers. In this way, the various inputs are associated with separate data fields of a custom data structure for a poll, such that the poll has structured data. Accordingly, for purposes of the present disclosure, a formal poll, or structured poll is a content posting that has been explicitly designated by the end-user as being intended as a poll, and is thus stored in a data structure that supports a content posting format specific to a formal or structured poll.

Consistent with embodiments of the invention, and as described in greater detail below, a supervised machine learning technique is used to generate or train one or more machine learned models, with the aim of using the machine learned models to predict when a content posting is a poll—that is, a poll that has been created through the default content posting user interface, and therefore does not use a content posting format that is dedicated to structured polls, where the intent of the end-user has been explicitly specified. Because an informal poll may be created as text or with an image, consistent with some embodiments, separate machine learned models are used for text-based input, and image-based input. For example, when a content posting is comprised of an image, the image is provided as input to a first machine learned model that processes the image to generate an output representing a prediction, or likelihood, that the content posting was intended to be a poll. Similarly, when the content posting is comprised of text, the text is provided as input to a second machine learned model that processes the text to generate an output representing a prediction, or likelihood, that the content posting was intended to be a poll. Consistent with some embodiments, the pre-trained machine learning models are derived as binary classifiers, such that the output of each model is a class identifier, indicating whether the content posting is a poll (e.g., an informal poll), or is not a poll.

Consistent with embodiments of the invention, when an end-user generates a content posting, the content posting is provided as input to one of the two pre-trained machine learned models. If a determination is made that a content posting was intended as a poll, the end-user responsible for creating the content posting is presented with a user interface including a recommendation or message indicating that the content posting can, at the option of the end-user, be converted from an informal poll to a formal or structured poll. Accordingly, the content posting is further analyzed to identify within the content posting a question, and one or more answers to the question. If the end-user opts to convert the informal poll to a formal or structured poll, portions of text representing the question and the one or more answers are extracted from the original content posting, and stored in specific data fields of a data structure provided to support the content posting format that is specific to structured polls. Accordingly, once the data structures is populated with the appropriately extracted text, a user interface is presented to the end-user allowing the end-user to edit the text of the question and the text of the one or more options or answers that have been identified by analyzing the content posting. Finally, when the end-user is satisfied with the content of the formal or structured poll, the content posting is posted or re-posted to the feed and presented to various end-users, who are then able to interact with the formal or structured poll, for example, by selecting one of the several answers to the question. Similarly, the end-user who posted the structured poll is provided with analytics, via a custom user interface, providing such information as the number of end-users who viewed the poll, the number of end-users who voted or selected one of the various designated answers or options associated with the poll, and so forth.

Analyzing a content posting to predict an intent of the end-user who posted the content is inherently a technically challenging problem. In order to predict whether a content posting is intended as a poll, several technical problems must be solved:

Content postings differ significantly from one another, making it technically challenging to identify specific characteristics or traits of a content posting for purposes of classifying the content posting as being intended as a poll.

Content postings may include text, images, or a combination of both, further complicating the technical challenges in classifying content.

With many online services, the nature of content postings can vary widely, making it difficult to assess and or classify the content postings using conventional rule-based techniques.

When a content posting includes an image, inferring the intent of the end-user based on the image is difficult from a technical perspective, and identifying and obtaining individual content elements (e.g., the question and associated answers of an informal poll) of the content posting is technically challenging.

As described below in connection with the description of the various figures, embodiments of the invention address the technical challenges set forth above.

FIG. 1 illustrates an example of a user interface of a feed application of an online service. As shown in the example user interface 100, three separate content postings, or content items 102, 104, and 105, are presented in a vertically scrolling feed. In this example, the content posting with reference number 104 includes an image, as indicated by the bounding box with reference number 108. The end-user (e.g., Jim Best) responsible for creating and sharing the content posting 104 generated the image to include a question 110, and several answers 112, where each answer is mapped to a specific interactive social gesture available via the feed to those who may view the content posting in their respective personalized feeds. Specifically, the image contains the text, "Which Video Conferencing Software Do You Prefer?" 110. Each of the several answers (e.g., "Zoom," "Google Meet," "GoTo Meeting," and "MS Teams") is shown to be mapped to, or associated with, a specific interactive social gesture. Here, the interactive social gestures are different buttons or icons, each representing a different reaction an end-user can express relating to the content posting. Those skilled in the art will appreciate that these types of interactive social gestures are commonly referred to as a "Like" button. In this case, each of the several graphical buttons or icons is meant to convey a different reaction to the content posting by the viewing end-user. By mapping the different answers to the different icons or buttons associated with different social gestures, the end-user responsible for posting the content item can convey to the end-users who may view the content item that each icon or graphic is associated with a different answer or voting option. Accordingly, if a viewing end-user prefers the answer, "GoTo Meeting," the viewing end-user can select the interactive social gesture (e.g., the GUI button) associated with or represented by the heart-shaped icon or image 114.

In this manner, the end-user who has posted the content item 104 creates an informal poll—that is, a poll that has a content posting format that is not explicitly designed to support a structured or formal poll. Each viewing end-user who chooses to provide an answer to the question posed in the informal poll does so by selecting an icon or image (e.g., a GUI button) that corresponds with his or her preferred answer. There are several significant disadvantages to this type of informal poll, particularly when compared to a formal or structured poll. First, there are no analytics provided to the end-user responsible for creating and sharing the informal poll. For example, there may be no way to obtain a count of the number of people to whom the informal poll was presented. Moreover, the only way to obtain a count of the number of votes for each answer is to review the content posting as presented in the feed. Additionally, whereas a formal or structured poll may provide an option allowing end-users to vote privately, or in some instances, anonymously, no such option exists for informal polls. With an informal poll, each end-user's vote is publicly available to view by all end-users who are able to view the poll. This may discourage some end-users from participating in the poll.

Figure 2:
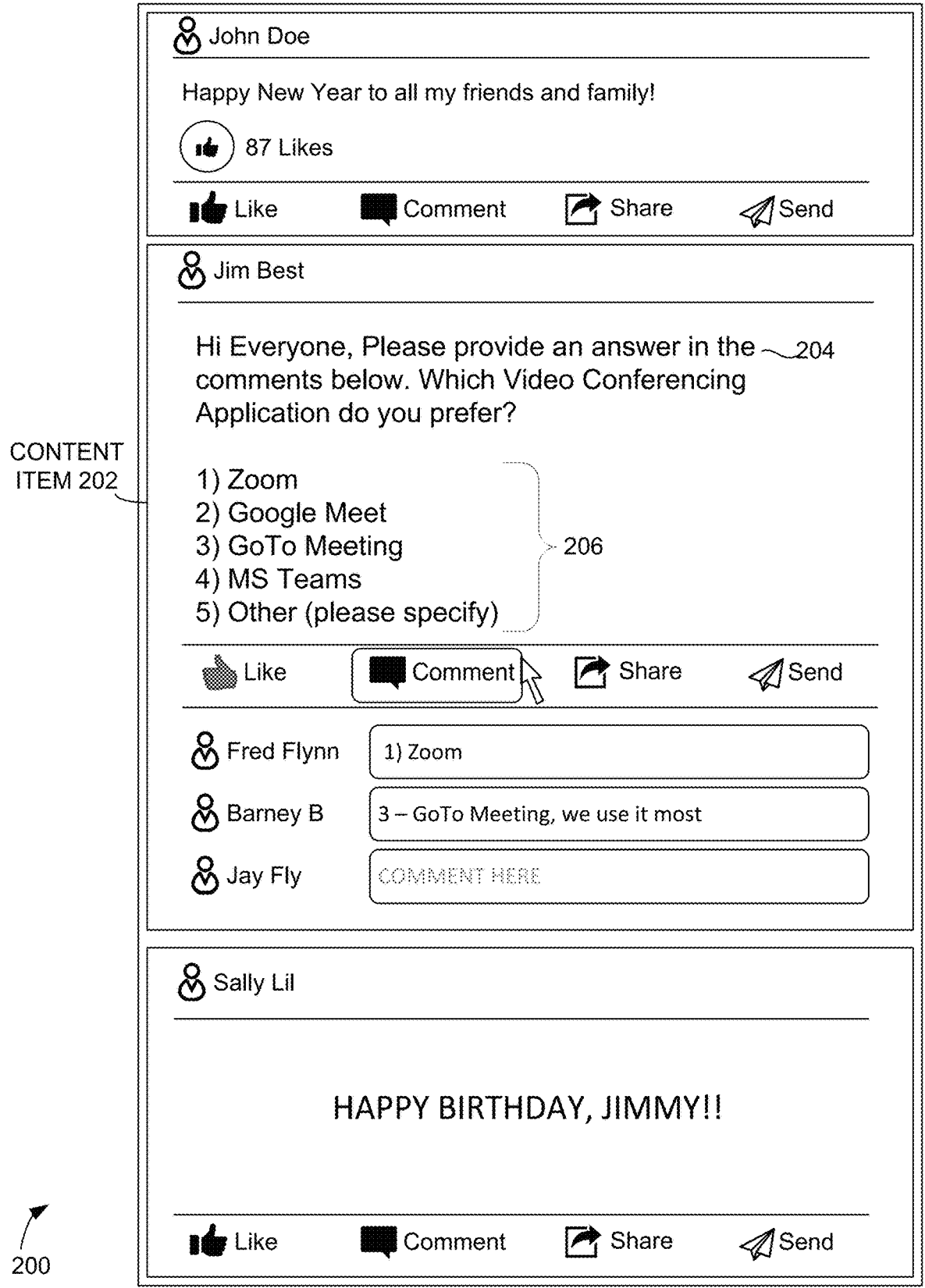
FIG. 2 is a user interface diagram illustrating a second example of a user interface for a feed, including a content item posted with text and representing a poll.

Referring now to FIG. 2, an example user interface 200 associated with a feed applications is presented. While the content item with reference number 104 (FIG. 1) is an example of an informal poll that has been created as an image, the content item with reference number 202 in FIG. 2 is an example of an informal poll derived with text. For instance, using the default content posting user interface, an end-user has simply provided a text-based question 204, and several answers 206. In this instance, the creator of the poll has prompted the viewing end-users to select or indicate an answer to the question posed in the poll via the comments feature of the feed. For example, in most feed applications, a comments feature allows end-users to whom a content posting has been presented to provide commentary in connection with the content item. In this instance, the creator of the poll has prompted the viewing end-users to add a comment to the content posting to indicate an answer to the question posed in the poll. This technique for creating an informal poll suffers from all of the same problems described above in connection with the image-based informal poll.

Figure 3:
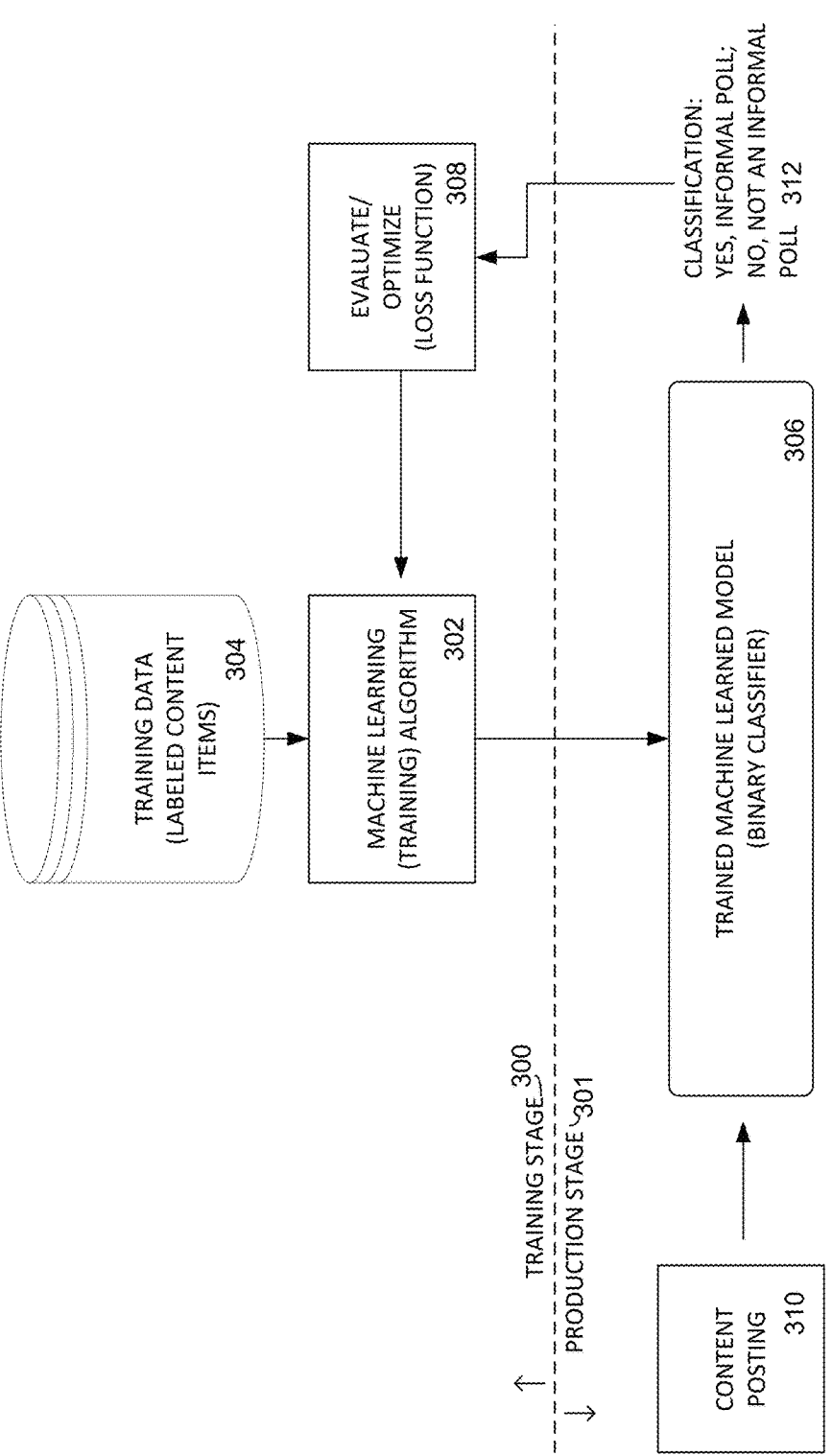
FIG. 3 is a diagram illustrating a technique by which a supervised machine learning algorithm is used to train a machine learned model to predict when a content posting is intended as a poll, consistent with embodiments of the invention.

FIG. 3 is a diagram illustrating the various functional components that provide for a technique by which a machine learned model is trained to predict whether a content posting is intended to be a poll—specifically, an informal poll—consistent with embodiments of the present invention. As illustrated in FIG. 3, during a training stage 300, a machine learning algorithm or training system 302 is provided with example inputs along with desired outputs, with the objective of learning a function (e.g., the model 306) that will map the example inputs to the outputs. The example inputs and outputs that are used to train the model 306 are generally referred to as the training data 304. The training data 304 are commonly referred to as labeled data, where each data item is a content posting that was previously posted to the feed of the online service, and the label identifies whether the content item is, or is not, an informal poll. A content posting that is labeled as an informal poll is considered a positive example, whereas a content posting that is labeled to indicate it is not an informal poll is considered a negative example. Consistent with some embodiments, to derive the training data 304, labels are assigned to the historical content postings by experts who review the content postings and make a determination as to whether the content posting was intended to be an informal poll, or not. Accordingly, in some instances, the labeling of the historical data to create the training data can be achieved through crowdsourcing, or other human or expert curation.

During the training stage 300, after each instance of training data is processed by the machine learned model 306 to predict an output, an evaluation or optimization operation is performed to determine how to manipulate the weights of the machine learned model 306 to generate more accurate predictions. For example, the evaluation operation generally involves comparing the predicted output of the machine learned model 306 with the actual output (e.g., the label) associated with the example input. A loss function is used to evaluate the performance of the model in generating the desired outputs, based on the provided inputs. Consistent with some embodiments, the loss function used in training the model 306 is a cross entropy loss function, where the Softmax function is used to normalize the final output of the model. During the training stage 300, as the training data are provided to the learning system 302, the weights of the individual neurons of the neural network model 306 are manipulated to minimize the error, as measured by the loss function 308. Once fully trained and deployed in a production setting 301, the model 306 is provided with a new content posting 310, similar to those used in training the model 306, and the model 306 then generates a prediction (e.g., a class output) 312 for each instance of the set of features that correspond with or represent the new content posting 310.

The output from the machine learning model—that is, the resulting classification of a content posting—may be subsequently used as additional training data to improve the performance of the machine learning model. For example, after initially training the machine learning model 302 during the training stage, the machine learned model will, during the production or inference stage, derive outputs for a number of new content postings. After some duration of time, these new content postings and the resulting outputs of the machine learning model may be provided—for example, via a feedback loop mechanism—as additional training data to improve the performance of the machine learning model.

The general approach described in connection with the example illustrated in FIG. 3 is applicable to training a first machine learned model, which makes predictions based on image-based content postings, as well as a second machine learned model, which makes predictions on text-based content postings. The training data for each of these machine learned models will differ in that the first machine learned model, which makes predictions based on image-based content postings, will be trained with training data primarily consisting of previously posted (e.g., historical) image-based content postings, such as the content item with reference number 102 in FIG. 1. Similarly, the second machine learned model, which is used for making predictions relating to text-based content postings, is trained with text-based content postings, such as the content item with reference number 202 in FIG. 2.

Figure 4:
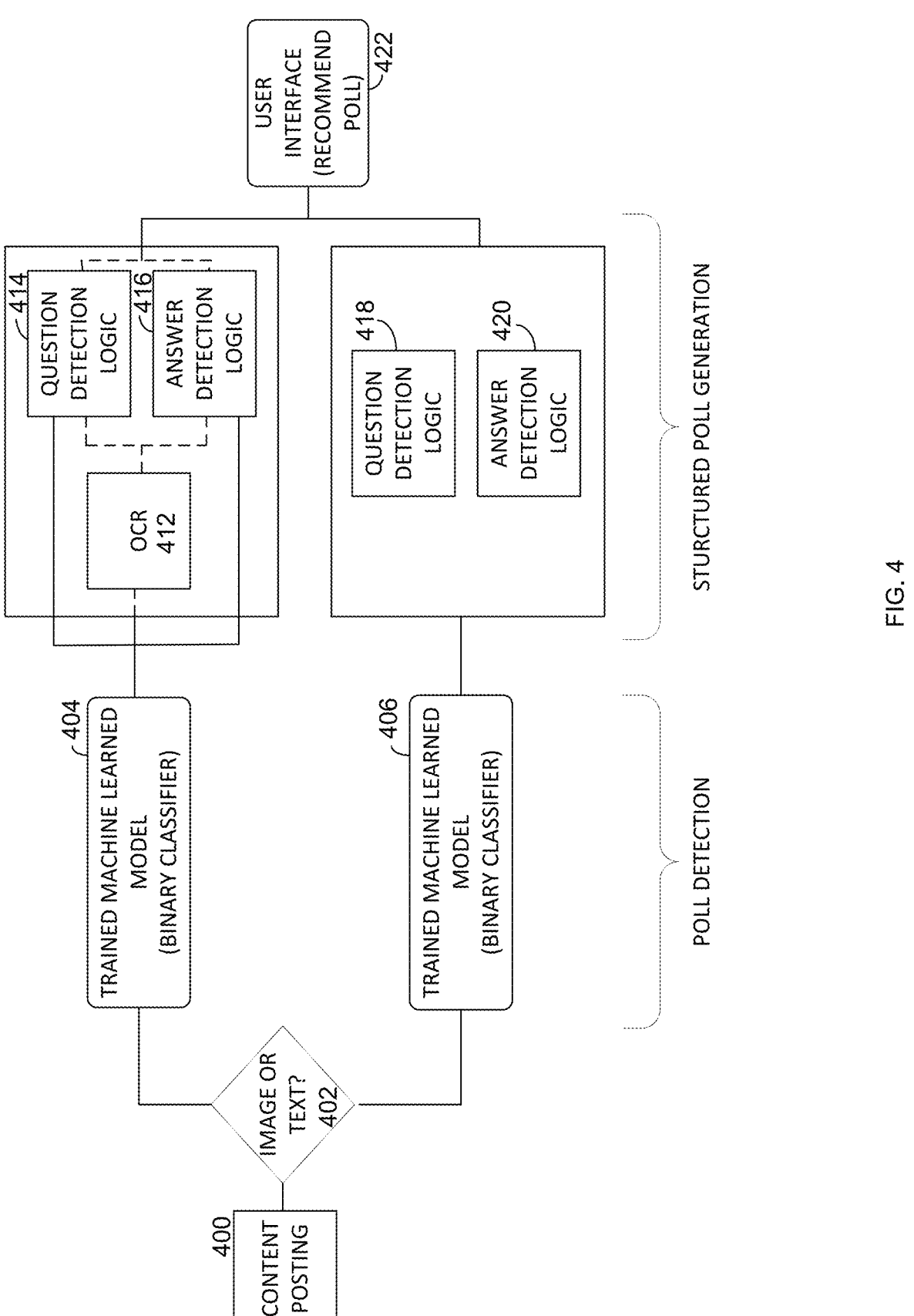
FIG. 4 is a diagram illustrating an example of a system architecture including trained machine learned models for use in predicting when a content posting is intended as a poll, consistent with embodiments of the invention.

FIG. 4 is a system diagram illustrating the overall architecture of a system for recommending that a content posting, initially created as an inform poll, be converted to a formal or structured poll, consistent with embodiments of the present invention. As illustrated in FIG. 4, an end-user may generate a content posting 400 for sharing via a feed of an online service. By way of example, the end-user may interact with a content posting or sharing user interface, via which the end-user can provide text-based input, and/or specify other digital assets (e.g., a hyperlink, a file for photograph, video or graphic image, etc.) to be included as part of a content posting to be shared via the feed of the online service.

Consistent with some embodiments, during the content posting flow, or immediately after a content posting has been shared, the system illustrated in FIG. 4 performs analysis on the newly created content posting to determine whether the intent of the end-user who posted the content was that the content posting be an informal poll. As shown in FIG. 4, this analysis involves two separate steps or stages. First, the content posting is analyzed to determine whether the content posting is intended as an informal poll. If the result of the initial analysis (e.g., poll detection) indicates that the content posting is an informal poll, then during the second stage (e.g., structured poll generation), the content item is further analyzed for the purpose of identifying a question and one or more answers or options. The end-user who posted the informal poll is then presented with a user interface that includes a message or recommendation, prompting the end-user to convert the informal poll to a formal poll. With some embodiments, the user interface that is presented to the end-user may include various input fields—one for the text of the question as identified within the content posting, and one for each of the separate answers that were detected. The end-user may be provided with the option to edit the text of the questions and/or answers, add new or additional answers, and set various operating parameters for the poll.

As illustrated in FIG. 4, the content posting is first analyzed 402 to determine if the content posting is text-based, or image-based. If the content posting is an image only, then the image is forwarded, as input, to a first pre-trained machine learned model 404, which processes the content posting to generate an output indicating whether the content posting is, or is not, a poll. For example, with some embodiments, the first pre-trained machine learned model 404 may be a binary classifier, and as such, the output of the model 404 is a value indicating the class of the input—that is, a poll, or not a poll. If the image-based content posting is determined to be a poll, then the content posting is further analyzed. Specifically, an optical character recognition (OCR) algorithm 412 is used to process the image and identify and detect text included within the image. Next, the image and the text are provided as input, and further processed by question detection logic 414, and answer detection logic 416. The question detection logic 414 analyzes the text, and optionally the image, to determine or detect the question posed by the poll. Similarly, the answer detection logic analyzes the text identified within the image by the OCR algorithm, as well as the image, to identify the portions of text representing various options or answers associated with the question posed by the poll. The question detection logic 414 and the answer detection logic 416 may be implemented to use heuristics and/or natural language processing to determine the question and the various answers, respectively. For instance, various rules may be used to identify the beginning and/or ending of a question and/or answer.

If the informal poll is text-based, the text of the content posting 400 is provided as input to the second pre-trained machine learning model 406, which analyzes the text to generate an output indicating whether the content posting is, or is not, a poll. If a determination is made that the content posting is a poll (e.g., an informal poll), then the text of the content posting is further analyzed, for example, by question detection logic 418 and answer detection logic 420. The question detection logic 418 uses rule or heuristic-based natural language processing algorithms to analyze the text, and to extract from the text that portion of text that represents the question. By way of example, the question detection logic 418 may parse the text to identify individual words and/or characters, such as a question mark ("?") that may represent the end of the question portion of the text, or numbering, which may represent the beginning of each answer or option. Using these natural language processing techniques, the question detection logic 418 extracts that portion of the text representing the question. Similarly, the answer detection logic 420 uses similar natural language processing algorithms to analyze the text for the purpose of extracting those portions of text representing the individual answers to the question. The resulting portions of text identified as representing the question and respective answers are then stored in specific data fields of a data structure associated with the specific content posting format for a structured poll. Finally, when a content posting has been identified as including an informal poll, a user interface 422 is presented to the end-user who created and/or shared the content posting. Specifically, and as described in greater detail below in connection with the description of FIG. 5, the user interface may include a recommendation to convert the informal poll to a formal or structured poll, for presentation in a content posting format that has been specifically designed and dedicated for presenting structured polls.

When a content posting has been identified as being intended as an informal poll, the end-user responsible for posting the informal poll may be presented with a user interface, such as the example with reference number 500-A in FIG. 5. In this example, the user interface 500-A prompts the end-user to convert the informal poll to a formal or structured poll. If the end-user opts to convert the poll, the end-user may be presented with a user interface that presents the extracted text representing the identified question and answers, as identified via the techniques described in connection with the description of FIG. 4, in a user interface such as the example with reference number 500-B. In this example user interface 500-B, the identified question and the one or more identified answers are presented as pre-filled input text in designated text input fields for the question and various answers. The end-user may opt to edit any one of the question and/or various answers. Although not shown in the example user interface 500-B, various other poll configuration settings or parameters may be presented as well. For example, in some instances, an option may be presented that would allow poll respondents to respond privately—for example, in a manner that would prevent others from viewing another end-user's selected answer. Similarly, in some instances, an option may be provided to allow poll respondents to provide an answer anonymously, so that even the end-user who posted the poll cannot personally identify an end-user by answer.

Figure 6:
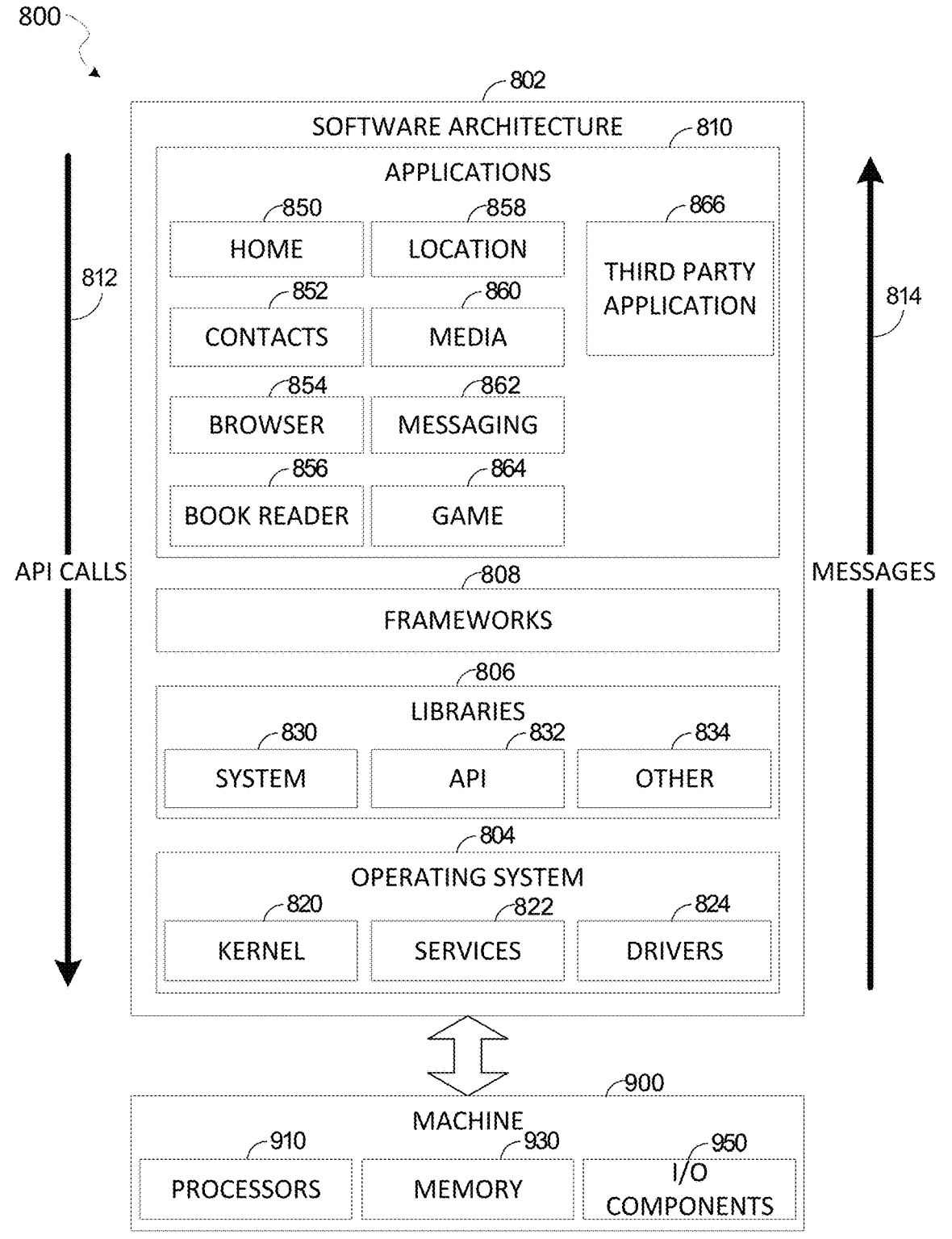
FIG. 6 is a block diagram illustrating a software architecture, which can be installed on any of a variety of computing devices to perform methods consistent with those described herein.

FIG. 6 is a block diagram 800 illustrating a software architecture 802, which can be installed on any of a variety of computing devices to perform methods consistent with those described herein. FIG. 6 is merely a non-limiting example of a software architecture, and it will be appreciated that many other architectures can be implemented to facilitate the functionality described herein. In various embodiments, the software architecture 802 is implemented by hardware such as a machine 900 of FIG. 7 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 606 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 608 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 7:
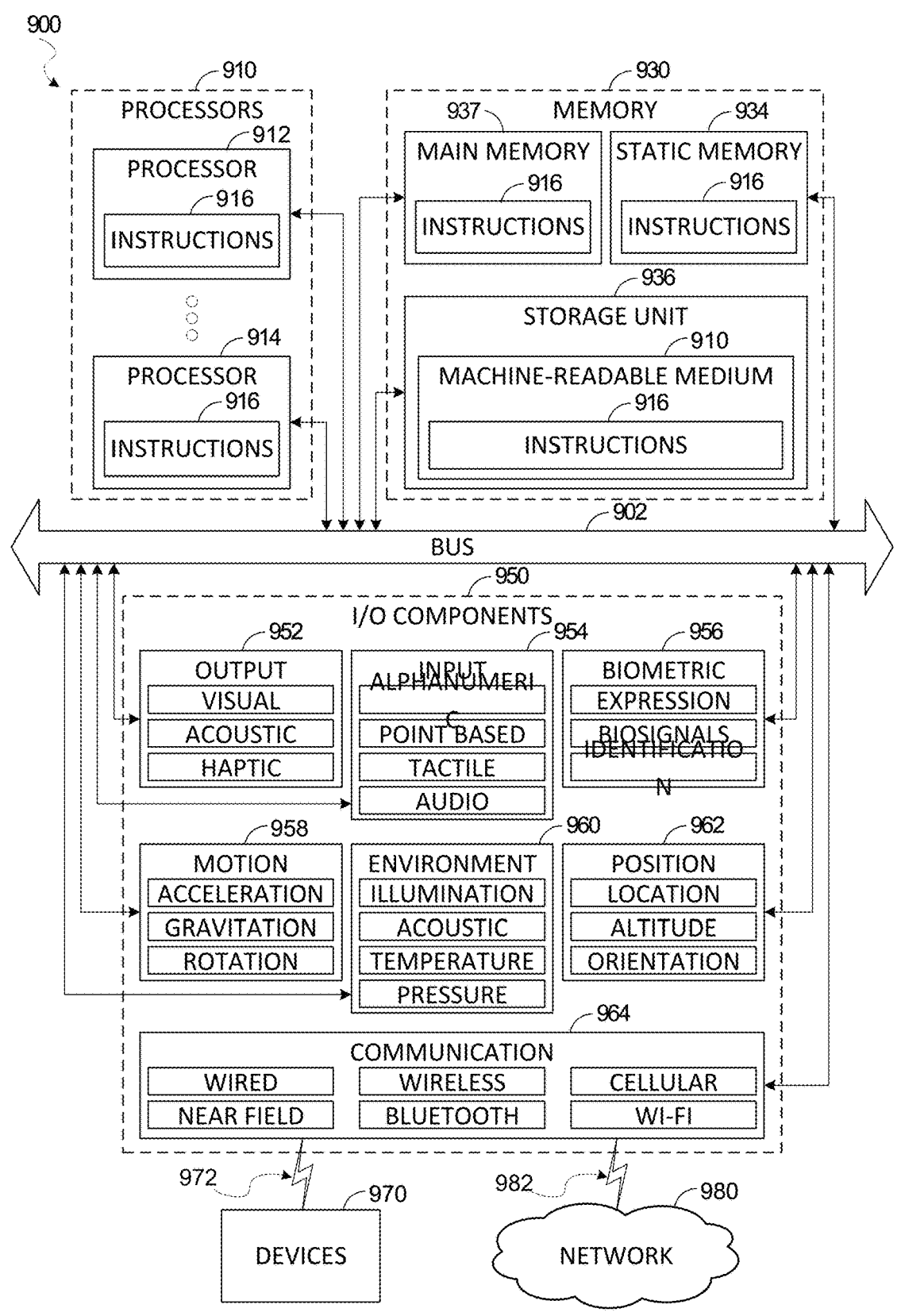
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 900 in the form of a computer system within which a set of instructions may be executed for causing the machine to perform any one or more of the methodologies discussed herein, according to an example embodiment. Specifically, FIG. 7 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute any one of the methods or algorithms described herein. Additionally, or alternatively, the instructions 916 may implement a system or model as described in connection with FIGS. 3 and 5, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, all accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method comprising:

providing to a pre-trained machine learned model, as input, a content posting that has been shared from an end-user via a feed application of an online service, the content posting having a first content posting format associated with a first data structure;

with the pre-trained machine learned model, processing the content posting to generate an output indicating that the content posting can be constructed as a structured poll;

processing the content posting to detect text within the content posting representing a question;

processing the content posting to detect text within the content posting representing one or more answers to the question;

presenting to the end-user a recommendation to convert the content posting from the first content posting format to a second content posting format comprising a structured poll, the second content posting format associated with a second data structure having a first data field for storing the text representing the question and one or more additional data field for storing the text representing each of the one or more answers to the question; and upon receiving an indication that the content posting is to be converted from the first content posting format to the second content posting format, converting the content posting from the first content posting format to the second content posting format, in part, by:

i) storing in a first data field the text representing the question, and ii) storing in one or more additional data fields the text representing each of the one or more answers to the question, wherein the first data field and the one or more additional data fields are part of a data structure associated with the second content posting format for a structured poll;

wherein the content posting provided as input to the pre-trained machine learned model comprises an image and the pre-trained machine learned model is a binary classifier trained to predict whether i) the image represents a poll, or ii) the image does not represent a poll.

2. The computer-implemented method of claim 1, wherein the pre-trained machine learned model has been trained with a cross entropy loss function and training data used in training the pre-trained machine learned model comprises images including a mapping of icons to answers, wherein the icons are associated with social gestures presented via the feed application of the online service.

3. The computer-implemented method of claim 1, wherein prior to processing the content posting to detect text within the content posting representing a question and processing the content posting to detect text within the content posting representing one or more answers to the question, performing an optical character recognition (OCR) process using the image as input to detect text within the image.

4. The computer-implemented method of claim 1, wherein the content posting comprises text and the pre-trained machine learned model is a text-based binary classifier trained to predict whether i) the text of the content posting represents a poll, or ii) the text of the content posting does not represent a poll.

5. The computer-implemented method of claim 1, further comprising:

prior to providing the pre-trained machine learned model, as input, the content posting that has been shared via the feed application, training the machine learned model with training data that comprises a combination of positive examples and negative examples, wherein a positive example is a historical content posting having the first content posting format and labeled to indicate that the historical content posting is a poll, and a negative example is a historical content posting having the first content posting format and labeled to indicate that the historical content posting is not a poll.

6. The computer-implemented method of claim 1, further comprising:

subsequent to converting the content posting from the first content posting format to the second content posting format, presenting a user interface to an end-user, the user interface providing analytics for a structured poll presented in the second content posting format, the analytics comprising one or more of:

a number indicating a count of end-users to whom the structured poll was presented via the feed application; and one or more numbers indicating for each answer to the question a count of end-users who selected a particular answer.

7. A system comprising:

a processor configured to execute computer-readable instructions; and a memory storage device storing computer-readable instructions, which, when executed by the processor, cause the system to:

provide to a pre-trained machine learned model, as input, a content posting that has been shared from an end-user via a feed application of an online service, the content posting having a first content posting format associated with a first data structure;

with the pre-trained machine learned model, process the content posting to generate an output indicating that the content posting can be constructed as a structured poll;

process the content posting to detect text within the content posting representing a question;

process the content posting to detect text within the content posting representing one or more answers to the question;

present to the end-user a recommendation to convert the content posting from the first content posting format to a second content posting format comprising a structured poll, the second content posting format associated with a second data structure having a first data field for storing the text representing the question and one or more additional data fields for storing the text representing each of the one or more answers to the question; and upon receiving an indication that the content posting is to be converted from the first content posting format to the second content posting format for a structured poll, convert the content posting from the first content posting format to the second content posting format, in part, by:

i) storing in a first data field the text representing the question, and ii) storing in one or more additional data fields the text representing each of the one or more answers to the question, wherein the first data field and the one or more additional data fields are part of a data structure associated with the second content posting format for a structured poll;

wherein the content posting provided as input to the pre-trained machine learned model comprises an image and the pre-trained machine learned model is a binary classifier trained to predict whether i) the image represents a poll, or ii) the image does not represent a poll.

8. The system of claim 7, wherein the pre-trained machine learning model has been trained with a cross entropy loss function and training data used in training the pre-trained machine learned model comprises images including a mapping of icons to answers, wherein the icons are associated with social gestures presented via the feed application of the online service.

9. The system of claim 7, comprising additional computer-readable instructions, which, when executed by the processor, cause the system to:

perform an optical character recognition (OCR) process using the image as input to detect text within the image, prior to processing the content posting to detect text within the content posting representing a question and processing the content posting to detect text within the content posting representing one or more answers to the question.

10. The system of claim 7, wherein the content posting comprises text and the pre-trained machine learned model is a text-based binary classifier trained to predict whether i) the text of the content posting represents a poll, or ii) the text of the content posting does not represent a poll.

11. The system of claim 7, comprising additional computer-readable instructions, which, when executed by the processor, cause the system to:

prior to providing the pre-trained machine learned model, as input, the content posting that has been shared via the feed application, train the machine learned model with training data that comprises a combination of positive examples and negative examples, wherein a positive example is a historical content posting having the first content posting format and labeled to indicate that the historical content posting is a poll, and a negative example is a historical content posting having the first content posting format and labeled to indicate that the historical content posting is not a poll.

12. The system of claim 7, comprising additional computer-readable instructions, which, when executed by the processor, cause the system to:

subsequent to converting the content posting from the first content posting format to the second content posting format, present a user interface to an end-user, the user interface providing analytics for a structured poll presented in the second content posting format, the analytics comprising one or more of:

a number indicating a count of end-users to whom the structured poll was presented via the feed application; and one or more numbers indicating for each answer to the question a count of end-users who selected a particular answer.

13. A system comprising:

means for providing to a pre-trained machine learned model, as input, a content posting that has been shared from an end-user via a feed application of an online service, the content posting having a first content posting format associated with a first data structure;

with the pre-trained machine learned model, means for processing the content posting to generate an output indicating that the content posting can be constructed as a structured poll;

means for processing the content posting to detect text within the content posting representing a question;

means for processing the content posting to detect text within the content posting representing one or more answers to the question;

means for presenting to the end-user a recommendation to convert the content posting from the first content posting format to a second content posting format comprising a structured poll, the second content posting format associated with a second data structure having a first data field for storing the text representing the question and one or more additional data field for storing the text representing each of the one or more answers to the question; and upon receiving an indication that the content posting is to be converted from the first content posting format to the second content posting format, means for converting the content posting from the first content posting format to the second content posting format, in part, by:

i) storing in a first data field the text representing the question, and ii) storing in one or more additional data fields the text representing each of the one or more answers to the question, wherein the first data field and the one or more additional data fields are part of a data structure associated with the second content posting format for a structured poll;

wherein the content posting provided as input to the pre-trained machine learned model comprises an image and the pre-trained machine learned model is a binary classifier trained to predict whether i) the image represents a poll, or ii) the image does not represent a poll.

14. The system of claim 13, wherein the pre-trained machine learning model has been trained with a cross entropy loss function and training data used in training the pre-trained machine learned model comprises images including a mapping of icons to answers, wherein the icons are associated with social gestures presented via the feed application of the online service.

15. The system of claim 13, further comprising:

means for performing an optical character recognition (OCR) process using the image as input to detect text within the image, prior to processing the content posting to detect text within the content posting representing a question and processing the content posting to detect text within the content posting representing one or more answers to the question.

16. The system of claim 13, wherein the content posting comprises text and the pre-trained machine learned model is a text-based binary classifier trained to predict whether i) the text of the content posting represents a poll, or ii) the text of the content posting does not represent a poll.

17. The system of claim 13, further comprising:

means for training a machine learned model with training data that comprises a combination of positive examples and negative examples, wherein a positive example is a historical content posting having the first content posting format and labeled to indicate that the historical content posting is a poll, and a negative example is a historical content posting having the first content posting format and labeled to indicate that the historical content posting is not a poll.

* * * * *